United States Patent [19]

Johnson et al.

[11] Patent Number: 4,775,473

[45] Date of Patent: Oct. 4, 1988

[54] PACKAGED ABSORBENT

[75] Inventors: Mark S. Johnson, Chicago; Manojlo Jovanovic, Wheeling; Rudolph C. Valenta, Buffalo Grove, all of Ill.

[73] Assignee: Oil-Dri Corporation of America, Chicago, Ill.

[21] Appl. No.: 23,246

[22] Filed: Mar. 9, 1987

[51] Int. Cl.$^4$ .............................................. B01D 15/00
[52] U.S. Cl. ................... 210/484; 210/502.1
[58] Field of Search ............... 210/484, 503–505, 210/924, 502.1

[56] References Cited

U.S. PATENT DOCUMENTS

| | | | |
|---|---|---|---|
| 3,739,913 | 6/1973 | Bogosian | 210/924 |
| 4,111,813 | 9/1978 | Preus | 210/484 |
| 4,343,680 | 8/1982 | Field et al. | 210/924 |
| 4,659,478 | 4/1987 | Stapelfeld et al. | 210/690 |
| 4,682,422 | 7/1987 | Harris | 210/484 |

*Primary Examiner*—Ivars Cintins
*Attorney, Agent, or Firm*—Dressler, Goldsmith, Shore, Sutker & Milnamow

[57] ABSTRACT

An absorbent article suitable for absorption of aqueous as well as oleaginous liquids such as metal cutting fluids, hydraulic fluids, oils and the like is disclosed. The absorbent article is a spunlaced material sleeve closed at both ends and filled with an inherently flameproof particulate material, such as particulate clay material, having a certain particle size range. The spunlaced material is liquid permeable, oleophilic, and hydrophilic. The spunlaced material also has a liquid wicking rate that is at least equal to that of the particulate clay material contained within the sleeve. Preferred spunlaced materials are woodpulp/polyester spunlaced materials having a woodpulp-rich face and a polyester-rich face. The polyester-rich face is situated contiguous to the particulate absorbent material.

7 Claims, 9 Drawing Sheets

PACKAGED ABSORBENT

TECHNICAL FIELD

This invention relates to packaged absorbent materials. In one specific aspect, this invention relates to absorbent packages particularly well suited for containment and removal of oil and water seeps and leaks encountered in a manufacturing environment such as machine shops, and the like.

BACKGROUND OF THE INVENTION

Absorbent filled, elongated booms, usually having a built-in buoyancy, have been used to scavenge and/or contain oil spills on bodies of water. Illustrative such booms are shown in U.S. Pat. Nos. 3,607,741 to Sohnius, 3,617,566 to Oshima et al., 3,679,058 to Smith, 3,739,913 to Bogosian, and 4,366,067 to Golding. The outer covering for such booms is made of a hydrophobic material. An oil-absorbing cellulosic or synthetic material is contained within the covering.

German Offenlegungsschrift No. 1,951,173 describes absorbent material-containing flat sacks that are porous and can be used for the removal of spilled liquids. U.S. Pat. No. 4,497,712 to Cowling describes expendable fabric pillows partially filled with a granular absorbent which is a cellulosic organic material such as corn cobs ground into granules. After use such pillows are disposed of by burning. The pillow fabric material is surfactant-treated, spun-bonded nylon. U.S. Pat. No. 4,588,505 to Walley et al. describes water scavenger pouches made from an open-mesh, hydrocarbon-impervious cloth container that confines therewithin a water-absorbent polymer and ballast that causes the pouches to sink to the bottom of a hydrocarbon liquid pool.

Additionally, knit fabric sleeves filled with comminuted corn cobs are commercially available for oil and grease removal from floors and like surfaces. However, when such liquid-absorbing devices are used for their intended purpose, some of the liquid to be absorbed remains on the floor or like solid surface in the form of an undesirable wet spot, or even puddle, when the device is lifted from the floor for disposal. Also, such absorbent devices present a fire hazard in view of the known auto-oxidation properties of oil when absorbed into a fabric. Moreover, when such a device is stepped on or otherwise compressed, the absorbed liquid is readily expressed therefrom.

It has now been found that improved absorbent devices that minimize or obviate the aforementioned drawbacks of current commercially available packaged absorbent materials can be provided by utilizing a particulate clay material of certain particle size within a tubular envelope made from a spun-laced non-woven web with balanced wicking properties with respect to the particulate clay material. The tubular envelope can be a boom, pillow, or the like device.

SUMMARY OF THE INVENTION

The present invention provides an absorbent package that effectively utilizes an inherently flame proof particulate absorbent material and is eminently well suited for the containment and removal of liquids encountered in the industrial environment such as oil, metal cutting fluids and oils, hydraulic fluids, and the like.

More specifically, the present invention contemplates an absorbent article which comprises a spunlaced material sleeve closed at both ends and containing therein an oil-and-water absorbing particulate clay material having a particle size that passes through a U.S. sieve series 30-mesh screen but is retained on U.S. sieve series 200-mesh screen.

The spunlaced material is liquid-permeable, oleophilic, as well as hydrophilic. Moreover, the spunlaced material has a liquid wicking rate that is at least equal to that of the particulate clay material contained within the sleeve, and preferably a liquid wicking rate that is higher than that of the contained clay material for the liquid that is to be absorbed. The clay particulate material, on the other hand, has an affinity for the liquid to be absorbed that is greater than that of the spunlaced material.

The foregoing absorbent articles are useful for containment and removal of oleaginous and aqueous liquids from solid surfaces such as floors.

DESCRIPTION OF PREFERRED EMBODIMENTS

For an absorbent device of the present invention the proper clay material particle size is important in balancing the liquid wicking rate of the spunlaced material sleeve along the surface of the absorbent device and the absorption rate and capacity for the liquid into the particulate clay material.

To that end, and as is illustrated by the data presented hereinbelow, the clay particles must pass through a 30-mesh screen and must be retained on a 200-mesh screen, U.S. sieve series. Preferred are particles that pass through a 60- to 100-mesh screen and are retained on a 200-mesh screen. Particularly preferred for hydraulic oils are particles that pass through a 70- to 80-mesh screen and are retained on a 200-mesh screen. For aqueous emulsions such as cutting oils, particularly preferred are particles that pass through a 80- to 100-mesh screen and are retained on a 200-mesh screen. Particles that are coarser or finer than the foregoing have been found to exhibit an adverse effect on adsorption performance.

The source and volatile matter content of the clay material is not critical. Clays dried at various temperature levels can be used.

The spunlaced materials suitable for fabricating the sleeves or envelopes within which the particulate clay material is to be contained are those made by hydraulic entanglement of staple fibers of cellulosic or synthetic origin. Such materials can be made by the techniques described in U.S. Pat. Nos. 4,442,161 to Kirayosglu et al. and 3,485,706 to Evans. Particularly well suited for the present purposes are the woodpulp/polyester spunlaced materials of the general type described in the aforementioned U.S. Pat. No. 4,442,161. Spunlaced materials of varying wicking properties are commercially available under the designations SONTARA® 8801 and SONTARA® 8818. Also suitable for the present purposes is a spunlaced material available under the designation W892 from IFC Nonwovens, Inc., Jackson, Tenn., U.S.A.

The latter material has the following properties:

| properties: | |
| --- | --- |
| Unit weight | 2.35 oz/yd. |
| Thickness | about 10 mils |
| Mullen Burst Strength (Dry) | about 20 psi |
| Tensile Strength (Dry) | |
| machine direction (MD) | about 20 lbs/in. |
| cross direction (CD) | about 10.5 lbs/in. |
| Tensile Strength (Wet) | |
| machine direction (MD) | about 20 lb/in. |
| cross direction (CD) | about 10.4 lb/in. |
| Elongation (Dry; CD) | 83.3% |
| Elongation (Wet; CD) | 95.0% |
| Absorption Rate[1] | |
| Water | 1.6 seconds |
| TAPPI[2] Standard Mineral Oil | 19.3 seconds |
| Total Absorption Capacity (percent of dry weight of 4" × 4" piece of fabric) | |
| Water | 373% |
| TAPPI Standard Mineral Oil | 249% |
| Flame Resistance[3] at 45° | 6.7 seconds |
| Air Permeability at 0.5" $H_2O$ | 56 CFM/ft$^2$ |

[1]Time for two drops to spread to a diameter of one inch.
[2]Technical Association of the Pulp and Paper Industry, Inc., One Dunwoody Park, Atlanta, Georgia 30341.
[3]Flammability tester of United States Testing Co., described in Federal Register, vol. 40, No. 250, December 30, 1975, pages 59891 et seq.

Figure 1:
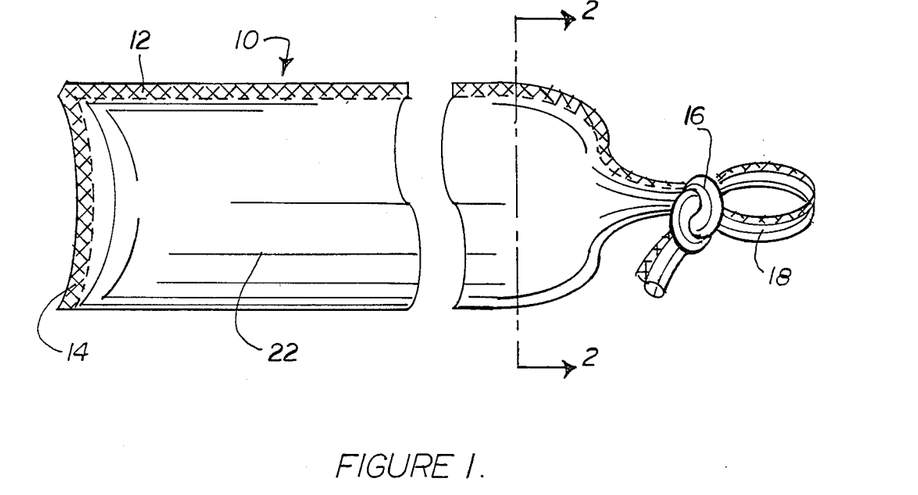
FIG. 1 is a fragmentary side elevation of an absorbent device embodying the present invention.
Figure 2:
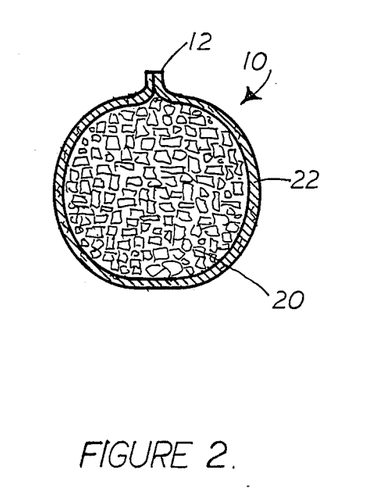
FIG. 2 is a sectional elevation taken along plane 2—2 in FIG. 1.

Referring to the drawing, FIGS. 1 and 2 show an elongated, tubular absorbent envelope 10 filled with particulate clay material 20 having a particle size that passes through a U.S. Sieve Series 30-mesh screen and is retained on a U.S. Sieve Series 200-mesh screen. The particle size distribution is substantially natural, i.e., the fraction of particles over or under a given size is proportional to the size. A longitudinal seam extends the full length of the envelope 10. At one end the envelope 10 is closed by seam 14, and at the other end by knot 16 in an unfilled portion of the envelope which, together with knot 16, forms loop 18. The thus formed loop provides a convenient handle for positioning absorbent envelope 10 at the desired location for spillage control as well as for picking up and handling of a spent absorbent envelope for disposal. The envelope 10 can be produced by sewing the fabric into a desired configuration, by heat sealing, or the like expedients, depending upon the nature of the particular spunlaced fabric.

Fabric material 22 for envelope 10 is a spunlaced nonwoven fabric containing woodpulp interlaced with staple fibers such as polyester, rayon, or the like. Wettability of material by aqueous and oleaginous materials can be inherent in the fabric by reason of the type of fibers present, or can be modulated by treatment with surface active agents. Preferably, fabric 22 is a woodpulp/polyester composite having a woodpulp-rich face and a polyester-rich face, with the polyester-rich face being positioned contiguous with the particulate clay material.

In this manner, the liquid transport properties of the spunlaced fabric material forming the envelope for the particulate clay material are utilized to optimize the overall liquid absorption rate and capacity of the absorbent package. Instead of solely a vertical rise of liquid in the body of the particulate material immediately above the liquid pool to be contained or absorbed, wicking by the spunlaced fabric material transports the liquid away also substantially horizontally along the fabric to previously dry particulate clay regions. Additionally, the wicking properties of the spunlaced fabric material facilitate liquid migration upwardly about the periphery of the elongated absorbent package so that the liquid can enter the contained particulate clay material mass not only upwardly from below but also radially inwardly from above the solid support surface for the absorbent package. Hydrostatic effects tending to slow down the vertical rise of liquid within the particulate clay material mass are thereby minimized.

If desired, the polyester face or the entire fabric material can be treated with a surfactant, such as a cationic surfactant, nonionic surfactant, or admixtures thereof, to further modulate the liquid transport properties thereof. Illustrative cationic surfactants suitable for this purpose are stearyldimethylbenzyl ammonium chloride, methyldodecylbenzyl triammonium chloride, substituted imidazolines of fatty acids, and the like. It is believed that the cationic surfactant is relatively loosely held on the synthetic fibers present and is swept inwardly and at least in part retained by the absorbent particulate clay material present. In that manner the spunlaced fabric can function in a manner similar to a one-way valving means that permits entry of water into the absorbent material-filled envelope but hinders its egress therefrom.

Illustrative nonionic surfactants are nonylphenolethoxylate containing about 10 ethylene oxide units, and the like. It is believed that the presence of the nonionic surfactant in the spunlaced fabric material enhances wicking.

Fabric material 22 has wicking properties that permit liquid transport along the material at a rate at least that of liquid transport rate into the particulate absorbent material itself. Preferably, the wicking rate of material 22 is greater than that of the particulate absorbent material so that particulate absorbent material beyond the confines of a liquid pool can be readily utilized to take up the liquid as discussed hereinabove.

Inasmuch as normally encountered liquids such as metal cutting oils or fluids often are oil-in-water emulsions, fabric material 22 must be wettable by oil as well as water and must have wicking properties for both types of liquids.

Figure 3:
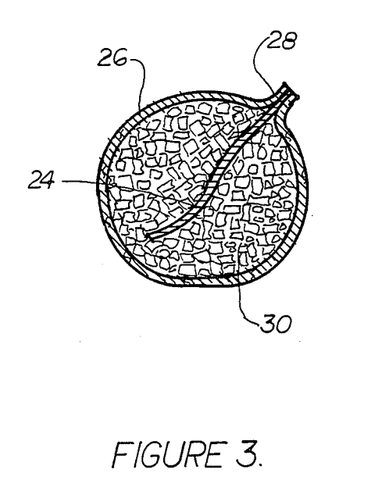
FIG. 3 is a sectional elevation similar to that of FIG. 2 but showing an embodiment of the present invention that utilizes an auxiliary wicking means within the absorbent device.
Figure 4:
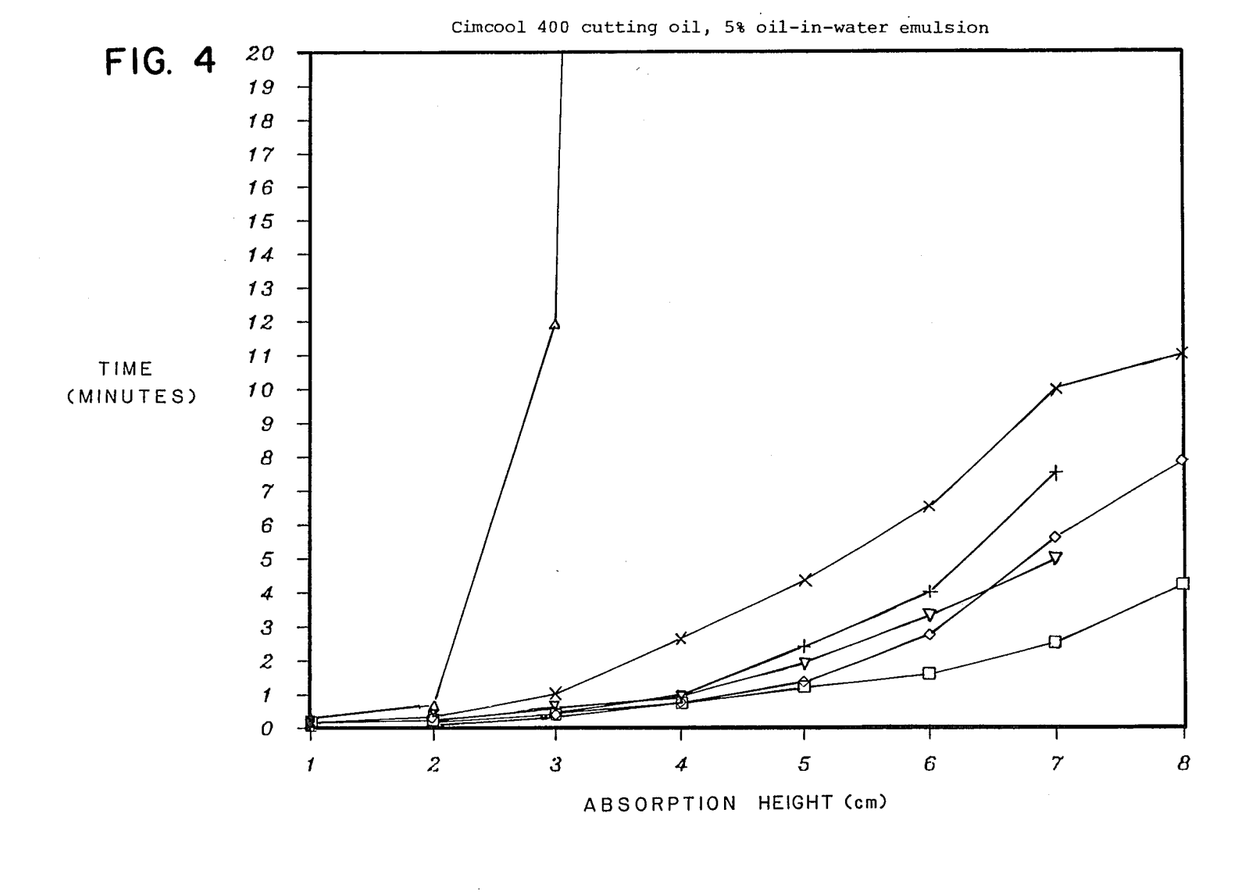
FIGS. 4 to 11 are graphical presentations of the absorption performance of devices embodying the present invention with respect to a wide variety of hydraulic oils and cutting oils.
Figure 5:
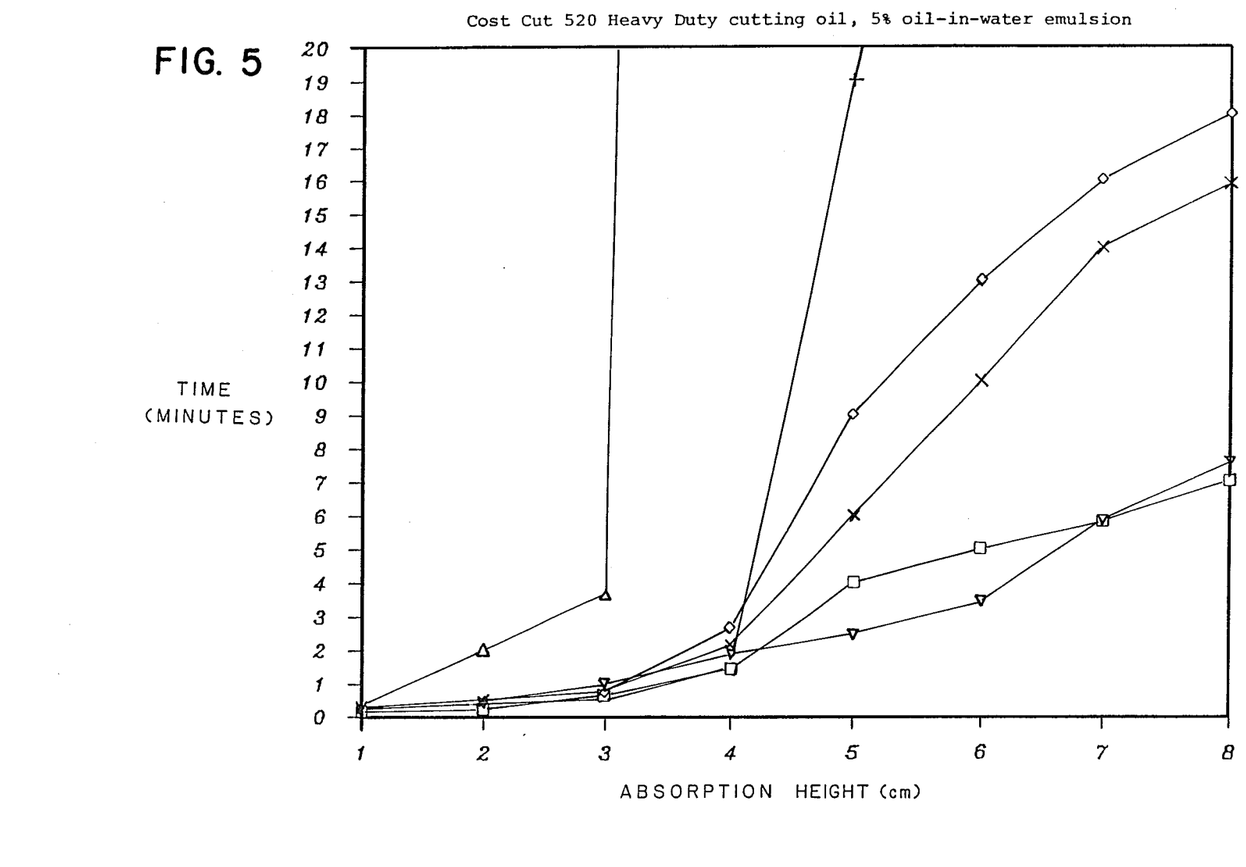
Figure 6:
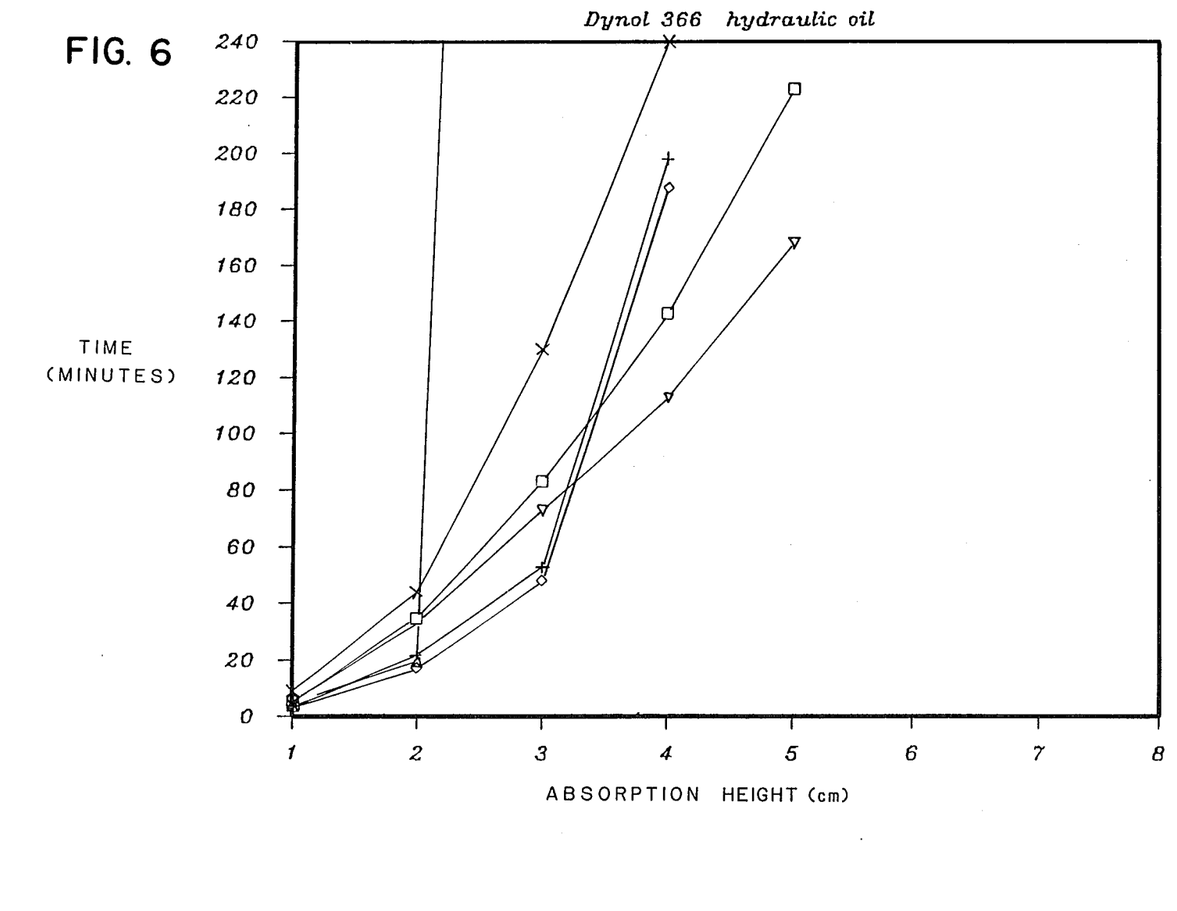
Figure 7:
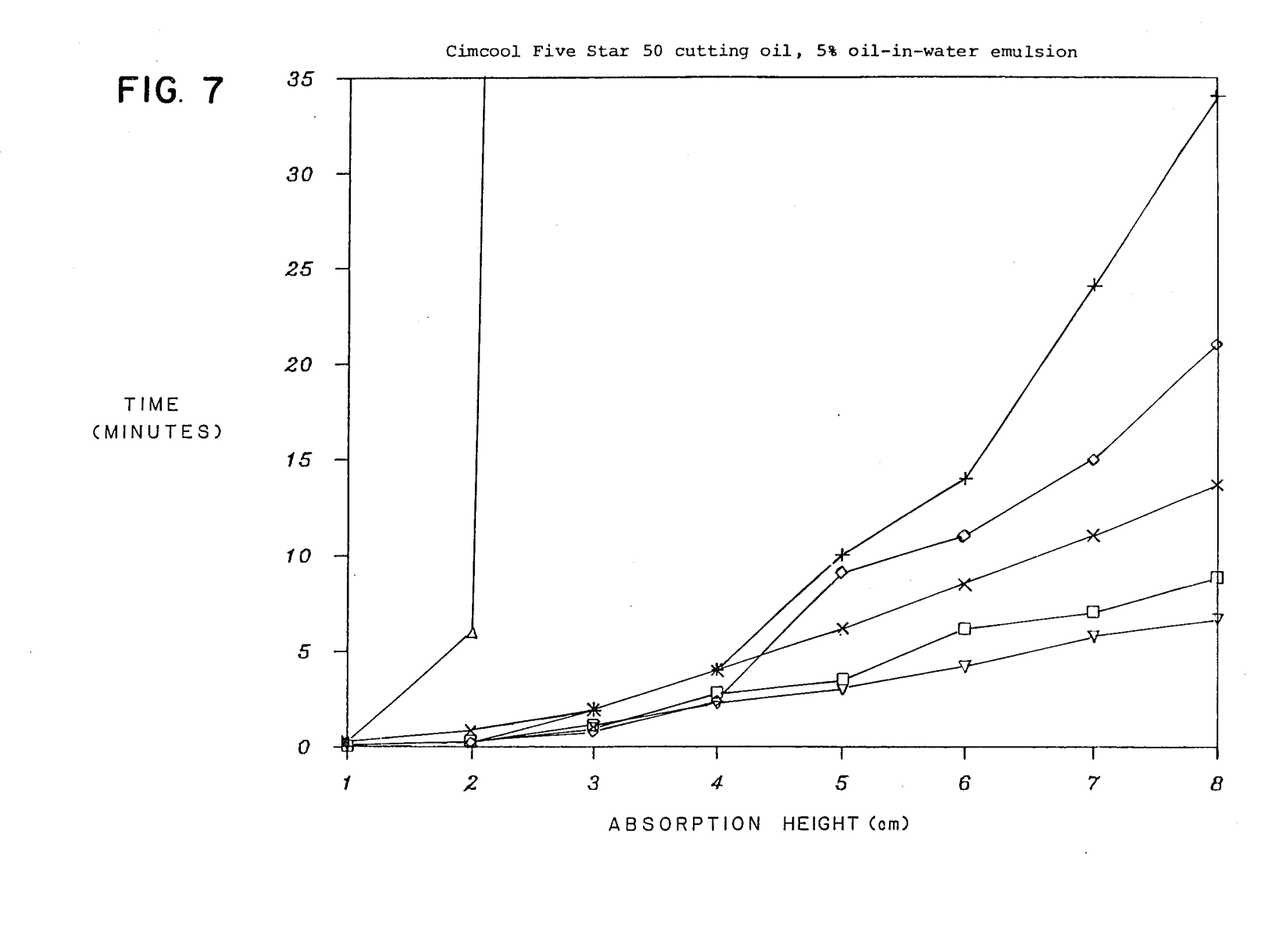
Figure 8:
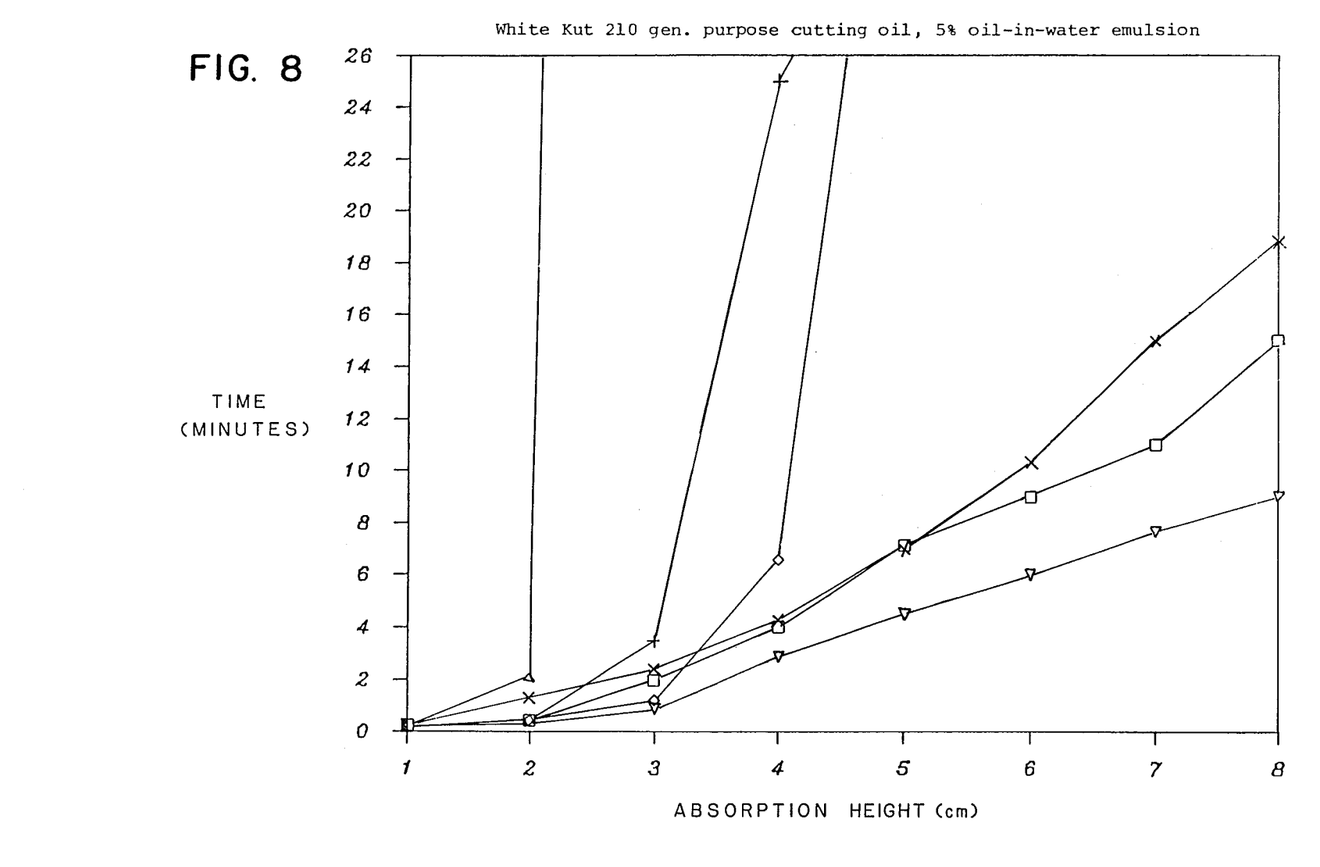
Figure 9:
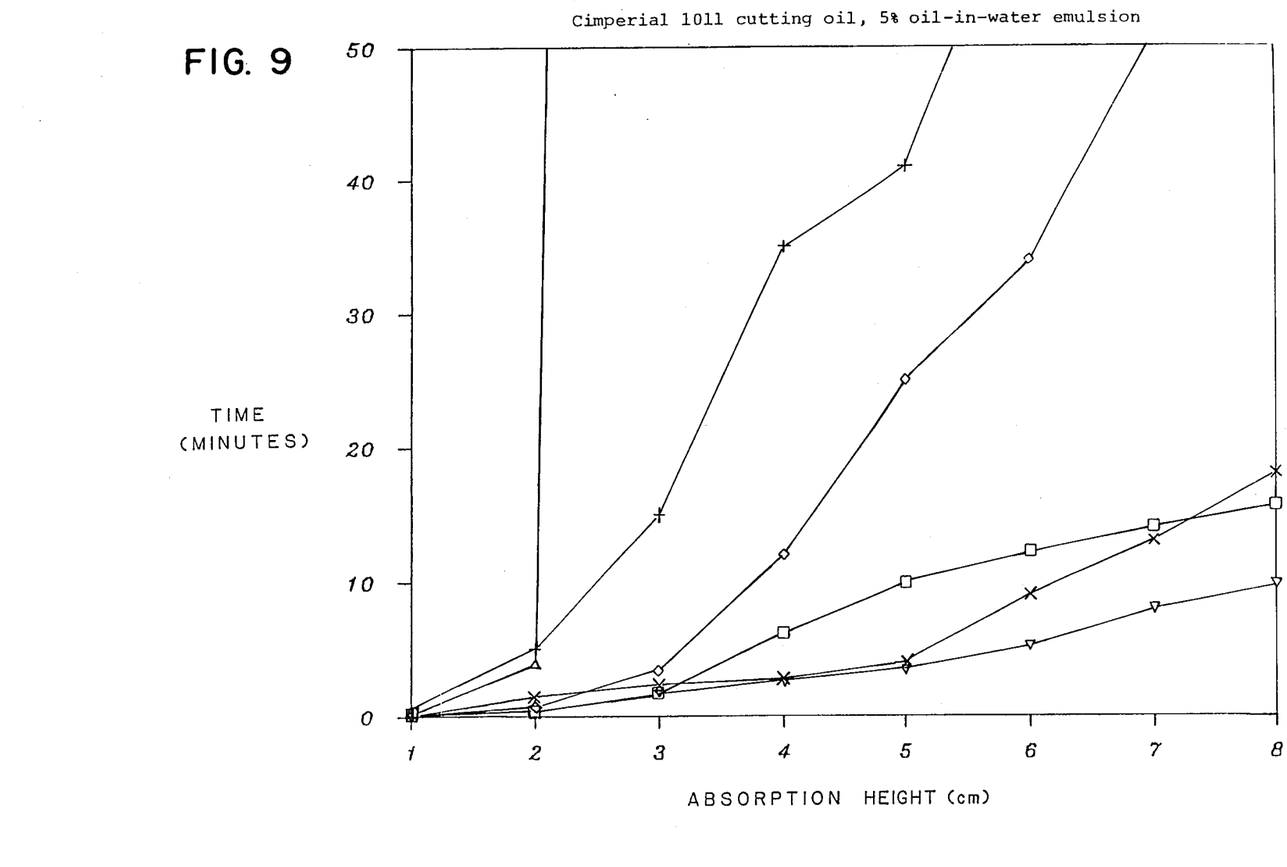
Figure 10:
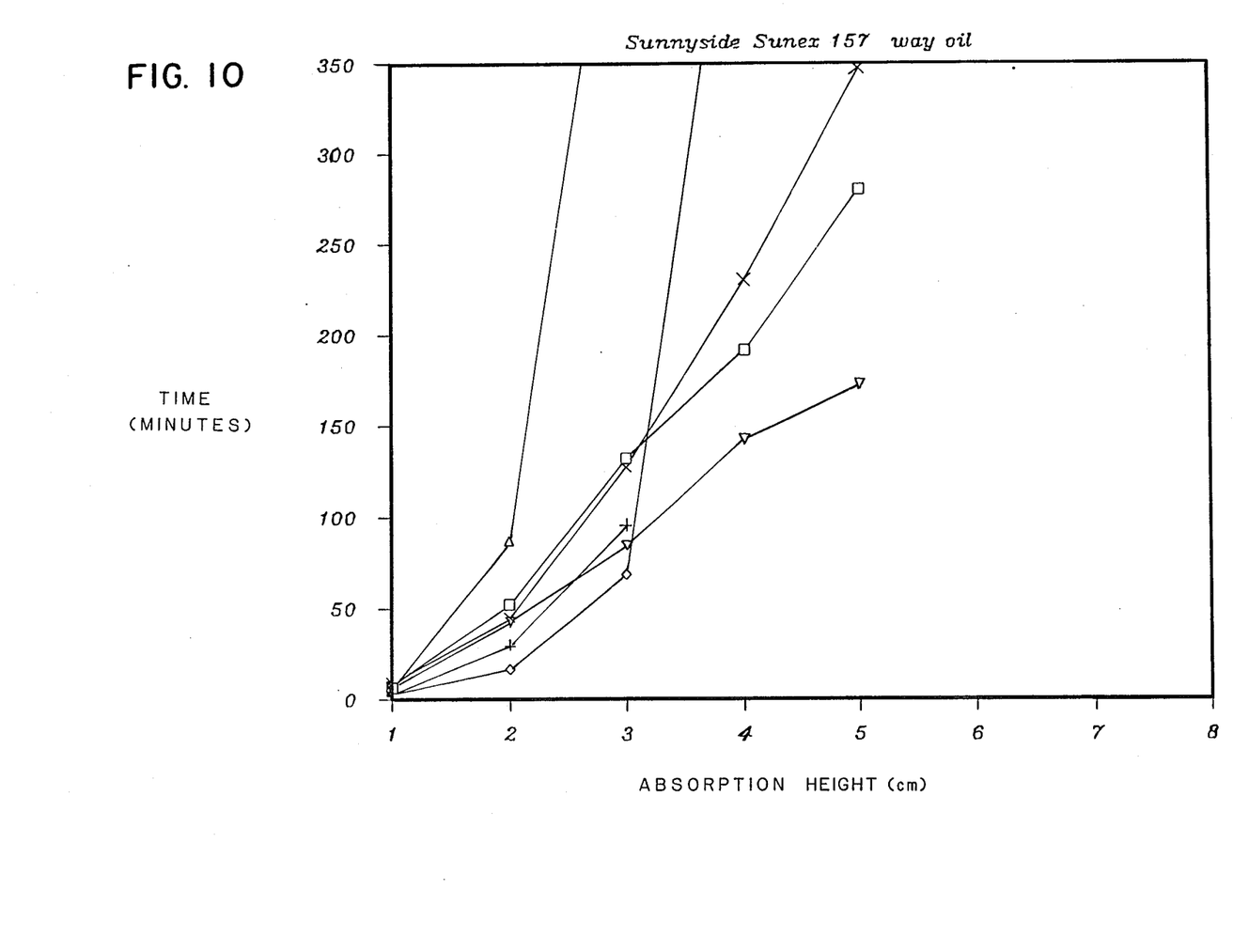
Figure 11:
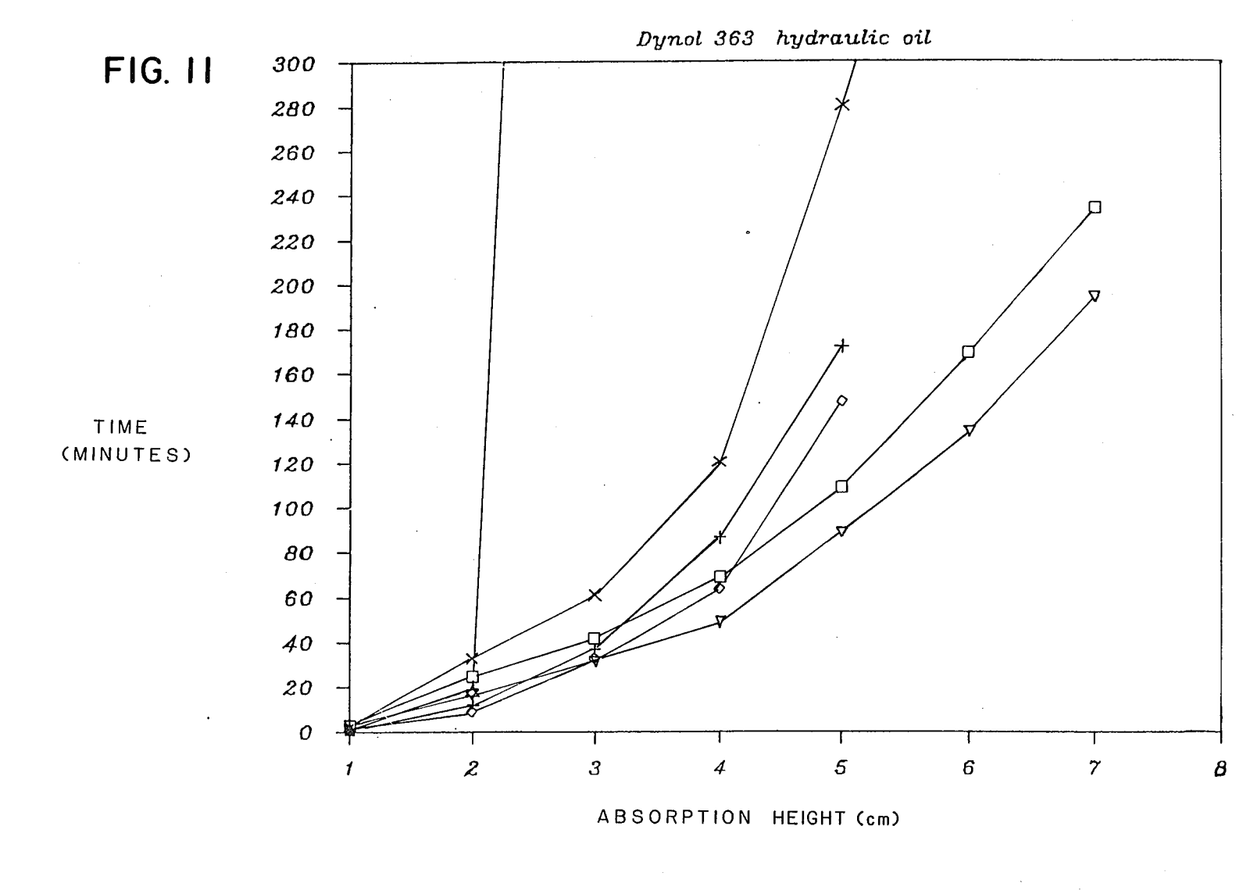

FIG. 3 illustrates another embodiment of the present invention that utilizes an internal, sheetform wicking member 24 integral with spunlaced fabric material envelope 26 and extending along the longitudinal axis of the particulate absorbent-containing envelope. One end of wicking member 24 can be sewn into seam 28 as shown in FIG. 3. Alternatively, wicking member 24 can be a unitary segment of fabric material envelope 26 that is folded inwardly before a longitudinal seam such as seam 28 is sewn. Wicking member 24 is surrounded by particulate absorbent clay material 30.

Seams such as seams 12 and 14 in FIGS. 1 and 2 and seam 28 in FIG. 3 can also be formed by heat-sealing or ultrasonic bonding when thermoplastic synthetic fiber content in the spunlaced materials forming the envelope is sufficiently high for that purpose.

The present invention is illustrated further by the following examples.

EXAMPLE 1

Absorption Performance Using Various Clay Materials

The absorption performance of various particulate clay materials through a non-woven, spunlaced fabric web was evaluated using an open-ended, transparent cylinder with markings at one-centimeter intervals along its side. One end of the cylinder was covered with a flame-resistant, spunlaced polyester/woodpulp web having a polyester-rich face and a woodpulp-rich face, a basis weight of about 2.35 ounces/yard$^2$, a Mullen burst strength of about 78 pounds per square inch and air permeability of about 56 cubic feet per minute per square foot at a pressure of 0.5 inches of water.

The cylinder was about 10 centimeters long and had an inside diameter of about 31.5 millimeters.

The cylinder was filled with the particulate clay material up to its 8-cm marking and with the clay material contiguous to the polyester-rich face of the web. The filled cylinder was inserted into a liquid-filled Petri dish with the web-covered end submerged and resting on a U-shaped wire so as to provide a spacing between the web and the bottom of the Petri dish. Upon positioning in the dish the cylinder end covered with the web was submerged in liquid and was maintained under a constant liquid head of about 0.5 centimeters.

Liquid rise in the clay material-filled cylinder was timed at one-centimeter intervals until the 8-cm marking was reached by the liquid or the liquid no longer rose perceptibly within the cylinder, whichever event occurred first.

The noted liquid rise times using various clay materials with various cutting oils and hydraulic oils are presented graphically in FIGS. 4 to 11.

The particulate clay materials tested and their respective particle sizes are listed in Table I, below.

TABLE I

| PARTICULATE CLAY MATERIALS | | |
|---|---|---|
| Clay Type | Particle Size[1] | Legend |
| Georgia-LVM[2] | 30/200 | □ |
| Georgia-LVM | 24/48 | + |
| Georgia-RVM[3] | 24/48 |  |
| Georgia-LVM | 6/30 | △ |
| Mississippi-LVM | 30/200 | x |
| Georgia-RVM | 30/200 | ▽ |

[1]The nominal designation XX/YY denotes that material passed through XX-mesh screen and was retained on YY-mesh screen, U.S. Sieve Series. For screen analysis see Table IV, below.
[2]LVM — low volatile matter content.
[3]RVM — regular volatile matter content.

The foregoing FIGURES show that particle size of the absorbent clay materials is a significant factor for performance, and that a particle size passing through a U.S. Sieve Series 30-mesh screen is important for optimum utilization of absorbent material with a wide variety of hydraulic oils and cutting oils.

EXAMPLE 2

Absorption Performance of Clay Materials Having Different Particle Sizes

In a manner similar to Example 1, above, the absorption performance of Georgia-LVM particulate clay material of varying particle size distributions was evaluated. A relatively viscous hydraulic oil (DYNOL™ TM 363) and a heavy duty cutting oil (COST CUT ™ 520; 5% oil-in-water emulsion) were utilized as the liquids to be absorbed.

The experimental observations are compiled in Tables II and III, below.

TABLE II

| | ABSORPTION OF HYDRAULIC OIL | | | | | | | |
|---|---|---|---|---|---|---|---|---|
| Particle Size, U.S. Sieve | Absorption Height, in cm & Time To Reach Absorption Height, in minutes | | | | | | | |
| Series | 1 | 2 | 3 | 4 | 5 | 6 | 7 | 8 |
| 30/40 | 3 | 10 | 23 | 67 | 140 | N/R[1] | N/R | N/R |
| 30/50 | 3 | 13 | 30 | 72 | 150 | N/R | N/R | N/R |
| 30/60 | 2 | 10 | 32 | 53 | 130 | N/R | N/R | N/R |
| 30/70 | 2 | 12 | 32 | 54 | 130 | N/R | N/R | N/R |
| 30/80 | 3 | 23 | 34 | 57 | 135 | N/R | N/R | N/R |
| 30/100 | 4 | 25 | 37 | 71 | 150 | N/R | N/R | N/R |
| 30/200 | 3 | 36 | 42 | 69 | 109 | 169 | 234 | N/R |
| 40/200 | 3 | 14 | 38 | 65 | 112 | 140 | 234 | 300 |
| 50/200 | 4 | 15 | 31 | 55 | 94 | 133 | 199 | 264 |
| 60/200 | 4 | 14 | 30 | 54 | 85 | 127 | 193 | 249 |
| 70/200 | 4 | 15 | 33 | 56 | 87 | 129 | 193 | 210 |
| 80/200 | 4 | 15 | 31 | 56 | 87 | 131 | 162 | 219 |
| 100/200 | 4 | 16 | 34 | 59 | 102 | 155 | 197 | 247 |
| GA-RVM w/fines[2] | 11 | 49 | 125 | N/R | N/R | N/R | N/R | N/R |
| MS-LVM w/fines[3] | 13 | 59 | 135 | N/R | N/R | N/R | N/R | N/R |

[1]N/R - not reached in 300 minutes.
[2]Georgia clay, dried; for screen analysis see Table IV, below.
[3]Mississippi clay, dried; for screen analysis see Table IV, below.

TABLE III

| | ABSORPTION OF CUTTING OIL | | | | | | | |
|---|---|---|---|---|---|---|---|---|
| Particle Size, U.S. Sieve Series | Absorption Height, in cm & Time To Reach Absorption Height, in minutes:seconds | | | | | | | |
| | 1 | 2 | 3 | 4 | 5 | 6 | 7 | 8 |
| 30/40 | 0:10 | 0:21 | 0:36 | 1:11 | 6:20 | 13:00 | 15:00 | 19:00 |
| 30/50 | 0:09 | 0:12 | 0:28 | 1:03 | 4:09 | 5:30 | 6:52 | 9:10 |
| 30/60 | 0:09 | 0:15 | 0:48 | 1:21 | 3:09 | 4:10 | 5:30 | 7:44 |
| 30/70 | 0:09 | 0:15 | 0:49 | 1:21 | 4:00 | 5:15 | 6:22 | 8:38 |
| 30/80 | 0:06 | 0:10 | 0:21 | 0:46 | 2:15 | 3:00 | 4:11 | 6:14 |
| 30/100 | 0:06 | 0:13 | 0:41 | 0:50 | 2:30 | 3:15 | 4:11 | 6:20 |
| 30/200 | 0:09 | 0:15 | 0:39 | 1:26 | 4:00 | 4:40 | 5:35 | 7:04 |
| 40/200 | 0:05 | 0:13 | 0:35 | 0:55 | 1:00 | 3:25 | 4:28 | 5:20 |
| 50/200 | 0:05 | 0:10 | 0:23 | 0:46 | 1:30 | 2:06 | 2:55 | 4:05 |
| 60/200 | 0:05 | 0:10 | 0:23 | 0:45 | 1:16 | 2:07 | 2:45 | 3:22 |
| 70/200 | 0:06 | 0:15 | 0:31 | 0:51 | 1:20 | 2:07 | 2:45 | 3:22 |
| 80/200 | 0:08 | 0:14 | 0:30 | 0:53 | 1:34 | 2:01 | 2:46 | 3:15 |
| 100/200 | 0:11 | 0:16 | 0:34 | 0:53 | 1:25 | 1:57 | 2:53 | 3:05 |
| GA-RVM w/fines[1] | 0:40 | 1:40 | 4:00 | 9:00 | 16:00 | 30:00 | 60:00 | 110:00 |
| MS-LVM w/fines[2] | 0:40 | 1:50 | 5:30 | 11:00 | 21:00 | 46:00 | 63:00 | 120:00 |

[1]Georgia clay, dried; for screen analysis see Table IV, below.
[2]Mississippi clay, dried; for screen analysis see Table IV, below.

TABLE IV

SIEVE ANALYSES OF PARTICLE SIZE DISTRIBUTION
OF PARTICULATE CLAY MATERIALS USED

| Particle Size | 6/30 GA-LVM | 24/48 GA-LVM | 24/48 GA-RVM | 30/200 GA-LVM | 30/200 GA-RVM | 30/200 MS-LVM | GA/RVM w/Fines | MS/LVM w/Fines |
|---|---|---|---|---|---|---|---|---|
| +4 | 0.2 | — | — | — | — | — | — | — |
| −4/+6 | 19.2 | — | — | — | — | — | — | — |
| −6/+10 | 36.1 | — | — | — | — | — | — | — |
| −10/+20 | 31.7 | 0.5 | 0.3 | — | — | — | — | — |
| −20/+30 | 6.4 | 35.4 | 17.9 | 0.8 | 0.0 | — | 0.04 | 2.5 |
| −30/+40 | 3.8 | 43.4 | 58.4 | 39.8 | 18.9 | 4.8 | 7.7 | 5.1 |
| −40/+50 | 1.1 | 18.4 | 19.4 | 29.8 | 34.2 | 26.7 | 21.2 | 16.7 |
| −50/+60 | 1.2 | 1.9 | 1.6 | 10.0 | 11.6 | 12.6 | 9.8 | 17.9 |
| −60/+70 |  | 0.5 | 2.3 | 5.0 | 6.9 | 8.2 | 6.3 | 9.7 |
| −70/+80 |  | — | — | 5.9 | 7.9 | 10.6 | 9.1 | 10.2 |
| −80/+100 | 0.2 | — | — | 4.3 | 6.0 | 8.4 | 8.7 | 7.1 |
| −100/+200 |  | — | — | 4.2 | 11.5 | 19.2 | 7.9 | 13.6 |
| −200/+325 |  | — | — | 0.2 | 3.0 | 9.4 | 19.2 | 9.2 |
| −325 | 0.1 | — | — | — | — | — | 10.0 | 8.1 |

GA — Georgia
MS — Mississippi
NOTE: In the above Table, a plus (+) sign before a numeral denotes particles retained on the U.S. Sieve Series screen having mesh size designated by the numeral; a minus (−) sign denotes particles passing through the U.S. Sieve Series screen having mesh size designated by the numeral.

The data in Tables II–IV demonstrate the significance of clay particle size for the purposes of the present invention. In particular, particles passing though a 60- to 100-mesh screen and retained on 200-mesh screen provide optimum overall absorption performance with a wide variety of aqueous and oleaginous liquids, and thus are preferred. On the other hand, a particle size distribution that includes a substantial amount of particles that pass through a 200-mesh screen has an adverse effect on absorption performance of the presently contemplated absorbent packages.

We claim:

1. An absorbent article suitable for removing oleaginous and aqueous liquids from a solid surface and comprising
    a spunlaced material sleeve that is liquid-permeable, oleophilic, hydrophilic, and closed at both ends; and
    an oil-and-water absorbing, particulate clay material contained within said sleeve;
    said spunlaced material having a liquid wicking rate at least equal to that of said particulate clay material; and
    said particulate clay material having a particle size that passes through U.S. Sieve Series 30-mesh screen but is retained on U.S. Sieve Series 200-mesh screen and having an affinity for said oil and said water that is greater than that of said spunlaced material.

2. The absorbent article in accordance with claim 1 wherein said spunlaced fibrous material is an oil-and-water wettable spunlaced polyester fabric.

3. The absorbent article in accordance with claim 1 wherein said spunlaced material is an oil-and-water wettable spunlaced polyester and woodpulp fabric.

4. The absorbent article in accordance with claim 1 wherein the particulate clay material has a particle size that passes through U.S. Sieve Series 60-mesh screen but is retained on U.S. Sieve Series 200-mesh screen.

5. The absorbent article in accordance wtih claim 1 wherein the particulate clay material has a particle size that passes through U.S. Sieve Series 70-mesh screen but is retained on U.S. Sieve Series 200-mesh screen.

6. The absorbent article in accordance with claim 1 wherein the particulate clay material has a particle size that passes through U.S. Sieve Series 80-mesh screen but is retained on U.S. Sieve Series 200-mesh screen.

7. The absorbent article in accordance with claim 1 wherein said spunlaced material has a polyester-rich face and a woodpulp-rich face, and wherein the particulate clay material is contiguous to said polyester-rich face.

* * * * *